United States Patent [19]

Pasto

[11] 3,898,309

[45] Aug. 5, 1975

[54] METHOD OF FORMING HIGH DENSITY OXIDE PELLETS BY HOT PRESSING AT 50°–100°C ABOVE THE CUBIC TO MONOCLINIC PHASE TRANSFORMATION TEMPERATURE

[75] Inventor: Arvid E. Pasto, Oak Ridge, Tenn.

[73] Assignee: The United States of America as represented by the United States Energy Research and Development Administration, Washington, D.C.

[22] Filed: May 11, 1973

[21] Appl. No.: 359,397

[52] U.S. Cl.............. 264/.5; 252/301.1 R; 264/125; 423/263; 423/592
[51] Int. Cl.² .......................................... G21C 21/00
[58] Field of Search ............... 264/.5, 109, 56, 125; 176/86 R, 93 R; 252/301.1 R; 423/263, 592

[56] References Cited
UNITED STATES PATENTS

| 3,031,395 | 4/1962 | Precht et al. ................... 176/93 R X |
|---|---|---|
| 3,117,372 | 1/1964 | McNees et al. ................ 176/93 R X |
| 3,219,593 | 11/1965 | Kling et al. ...................... 423/263 X |
| 3,263,004 | 7/1966 | Bean .............................. 176/93 R X |
| 3,300,848 | 1/1967 | Leitten, Jr. et al. ........... 176/93 R X |
| 3,485,717 | 12/1969 | Eich ................................... 176/86 R |
| 3,635,658 | 1/1972 | Ferri et al. ........................... 423/263 |
| 3,702,881 | 11/1972 | Das Chaklader ............... 264/125 X |

OTHER PUBLICATIONS

Stecura, S., Crystallographic Modifications and Phase Transformation Rates of Five Rare-Earth Oxides, BOM Report RI–6616, p. 12–24, 1965.

Primary Examiner—Benjamin R. Padgett
Assistant Examiner—R. E. Schafer
Attorney, Agent, or Firm—John A. Horan; David S. Zachry; John B. Hardaway

[57] ABSTRACT

A process for low temperature sintering of rare earth and actinide oxides which have a cubic to monoclinic transformation by heating a powder compact at a temperature just above the transformation temperature.

10 Claims, 2 Drawing Figures

3,898,309

METHOD OF FORMING HIGH DENSITY OXIDE PELLETS BY HOT PRESSING AT 50°–100°C ABOVE THE CUBIC TO MONOCLINIC PHASE TRANSFORMATION TEMPERATURE

BACKGROUND OF THE INVENTION

This invention was made in the course of, or under, a contract with the United States Atomic Energy Commission. It relates generally to a process for sintering rare earth and actinide oxides.

Many of the rare earths and actinides have been considered for nuclear application. Europium oxide in particular has been considered for use as a control rod material in a Liquid Metal Fast Breeder Reactor (LMFBR). It is chosen for this use because of its high absorption cross section for fast neutrons and because it retains a relatively high cross section for long time periods under irradiation conditions. However, for the oxide to have the necessary properties to act as a control rod, it must be near theoretical density in order to present a high europium density to the neutrons. Further, in order for the oxide to maintain its physical integrity against neutron irradiation, it is necessary for the grain size to be as small as possible, preferably less than about 100 microns. The need for a small grain size comes about because neutron irradiation causes lattice expansion which creates stresses in anisotropic materials. Small grains reduce the stresses which act on the individual grains. Prior to the invention herein disclosed no process existed for achieving near theoretical density in high purity rare earth and actinide oxides.

Prior art attempts at achieving high density in high purity, i.e., no dopants, rare earth and actinide oxides have been successful in achieving only about 95% theoretical density. High density sintered compacts of rare earth and actinide oxides containing dopants have been prepared. The use of a dopant, however, has a deleterious effect on the neutron absorbing properties of the compact.

SUMMARY OF THE INVENTION

It is thus an object of this invention to provide a process for producing high density, high purity rare earth and actinide oxides.

It is a particular object of this invention to provide a process for producing high density sintered compacts of high purity europia.

It is a further object of this invention to provide an article of manufacture which comprises a high density sintered compact of europia.

These and other objects are accomplished by hot pressing rare earth and actinide oxides which have a cubic to monoclinic transformation at a temperature which is just above the transformation temperature of the oxide.

DETAILED DESCRIPTION

Figure 1:
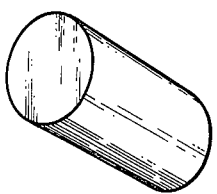
FIG. 1 is an isometric view of a sintered compact of this invention.

According to this invention it has been found that rare earth and actinide oxides which have a cubic to monoclinic transformation may be hot pressed at a temperature just above the transformation temperature to achieve essentially theoretical density while retaining a small grain size.

Many of the rare earth and actinide oxides have a high temperature transformation from the low temperature cubic to the high temperature monoclinic form. The low temperature cubic form is generally called the C-type oxide, and the high temperature monoclinic form is called the B-type oxide. These oxides generally have a transformation within the temperature range of 700° to 1,300°C. The oxides which fall within the class of this invention along with transformation temperatures are listed in the following table.

TABLE

| Oxide | Transformation Temp. °C. |
|---|---|
| $Eu_2O_3$ | 1050 |
| $Gd_2O_3$ | 1260 |
| $Cm_2O_3$ | 800–1300 |
| $Sm_2O_3$ | 950 |
| $Pm_2O_3$ | 750–800 |

In accordance with this invention, the oxide to be prepared into a sintered compact is supplied at a purity of 99.9 wt. %. When preparing the rare earth or actinide oxides for general applications any desired particle size may be used to achieve near theoretical density. However, when preparing $Eu_2O_3$ for nuclear applications where it is necessary to have a final average grain size of less than about 100 microns, the average particle size must be less than the final desired grain size.

Preferably, the process of this invention comprises first adding the oxide powder to a hot press die and then compacting the powder in the die at a pressure below that which will be used during hot pressing, e.g., about 1,000 psig. Alternatively, the article may be first isostatically pressed to fit the hot press die and then hot pressed. The pressures used in the hot pressing operation to achieve maximum density should be above 4,000 psig but preferably about 5,000 psig.

The essence of this invention is in the temperature used for sintering under hot pressing conditions. This invention comprises hot pressing the applicable oxides at a temperature which is just above the transformation temperature so that sintering occurs during the transformation. The applicable oxides have a cubic-to-monoclinic phase transformation which is reconstructive and generally irreversible. Being reconstructive, the transformation is diffusion controlled and thus the kinetics of the transformation are strongly temperature dependent. $Eu_2O_3$, for example, has a transformation temperature of about 1,050°C. At 1,050°C the transformation requires several days to go to completion. However, at 1,300°C, the transformation is complete in less than an hour. The process of this invention comprises hot pressing within the temperature range of about 50° to 100°C and preferably about 75°C above the transformation temperature. The rate at which the article is heated to the sintering temperature is not critical since very little sintering will occur below the transformation temperature. It is, therefore, preferred to heat rapidly to the sintering temperature and to then increase the pressure. Sintering to near theoretical density is complete in about 10 to 30 minutes. After sintering to near theoretical density, it is preferred to then increase the temperature 100° to 200°C under pressure in order for the transformation to go to completion.

Figure 2:
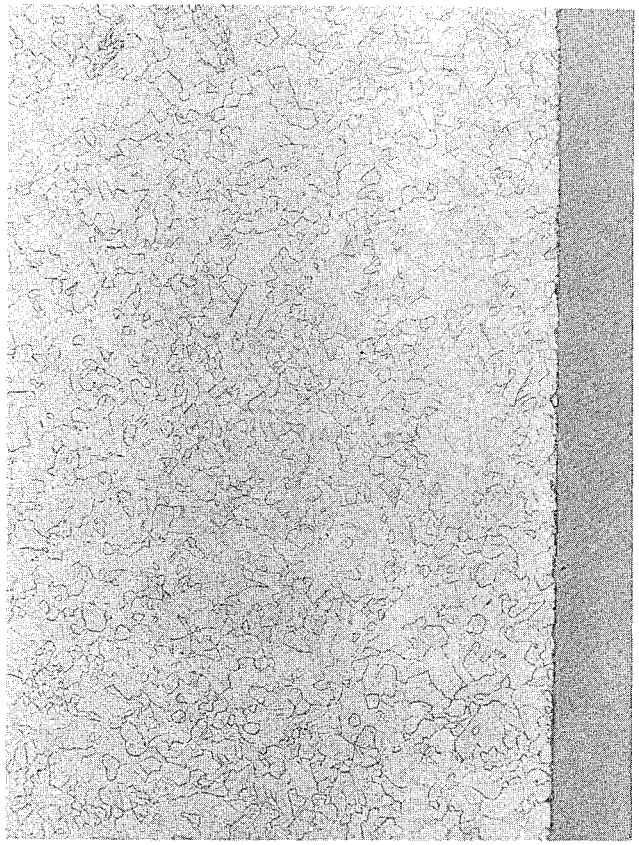
FIG. 2 is a photomicrograph of the microstructure of an article produced in accordance with this invention.
Figure 2:

The geometry of a sintered compact (1) of $Eu_2O_3$ as produced for use in an LMFBR is shown in FIG. 1. The compacts are cylindrical with a diameter of 0.3 to 0.8 inch and a preferred fabrication length-to-diameter ratio of 2 to 1. Control rods are produced by stacking the compacts and cladding the stack with 316 stainless steel. The microstructure of a sample produced in accordance with this invention by the example described below is shown in FIG. 2. As is readily observable, no porosity exists within the structure. Having generally described the process and article of this invention the following specific example is given as a further illustration thereof.

EXAMPLE

A nine-sample hot pressing apparatus comprising a vacuum chamber containing a graphite resistance heating element, cylindrical graphite dies having a diameter of 0.3 inch with matching punches and a movable ram which is passed into the vacuum chamber through a bellows was used in the example. Samples were prepared by placing about 5 grams of $Eu_2O_3$ having a particle size of less than 3 microns into each of the nine holes in the die in the hot pressing apparatus. The $Eu_2O_3$ was 99.99% pure with respect to the rare earths and 99.9% with respect to all other impurities. The punches were loaded to about 1,000 psig during a rapid heat-up to the sintering temperature which required about 30 minutes. When the sintering temperature was reached, the pressure was increased to 5,000 psig. The temperature and pressure were maintained for 20 to 30 minutes. The assembly was then heated to 1,300°C in about 7 minutes while maintaining pressure and held there for one hour prior to cool down. A vacuum of at least $5 \times 10^{-4}$ Torr was maintained during the entire process. Three separate runs were made using sintering temperatures of 1,050°C, 1,100°C, and 1,125°C.

By observing ram depression, densification could be determined as a function of time. Densification was nearly complete in 10 minutes at the sintering temperatures. Using a value of theoretical density of 7.97 g/cm$^3$, the sample sintered at 1,050°C, 1,100°C, and 1,125°C, respectively, exhibited densities of 97.5%, 99%, and 100%. A photomicrograph of the 100% dense sample is shown in FIG. 2. It is observed that no porosity is present and that grain sizes within the range of 16 to 64 microns exist within the sample. Grain sizes were determined by measuring the maximum distance across individual grains.

Prior to the present invention, $Eu_2O_3$ had been hot pressed at a temperature of about 1,500°C to achieve a density of only about 90%. It is thus seen that the process of this invention provides a superior method for sintering as well as providing a product which was heretofore unavailable. The achievement of high densities during a phase transformation is surprising in that one would have normally expected the compact to be broken up because of the volume changes which occur during the phase transformation. The process of this invention provides results which are unexpected in two respects. First, higher densities are achieved at temperatures which are less than those used in the prior art, and second, a structurally stable sintered product is produced while sintering during a phase transformation.

What is claimed is:

1. In a method of hot pressing a rare earth or actinide oxide having a cubic to monoclinic phase transformation wherein powders of said oxide are placed in a die and heated to a sintering temperature and sintered under pressure; the improvement comprising the steps of;

heating said oxide in the cubic form to a temperature within the range of 50° to 100°C above said transformation temperature, and, maintining the temperature within said range while said oxide is under pressure until said oxide has sintered to substantially theoretical density.

2. The method according to claim 1 wherein said temperature within said range is 75°C above said transformation temperature.

3. The method according to claim 1 wherein said oxide is pressed at a pressure in excess of 4,000 psi during sintering.

4. The method according to claim 1 comprising the further step of heating said oxide after sintering to a higher temperature for a time sufficient for said transformation to go to completion.

5. The method according to claim 1 wherein said oxide is selected from the group consisting of $Eu_2O_3$, $Pm_2O_3$, $Sm_2O_3$, $Cm_2O_3$, and $Gd_2O_3$.

6. The method according to claim 5 wherein said oxide is $Eu_2O_3$.

7. The method according to claim 1 wherein the beginning powder has a maximum particle size of about 3 microns and the final sintered compact has an average grain size of less than 100 microns.

8. The method according to claim 1 wherein the sintering temperature is maintained for 10 to 30 minutes.

9. The product produced by the process of claim 1.

10. A sintered compact of monoclinic $Eu_2O_3$ having a density of about 100% theoretical density, a purity of 99.9 wt. %, and a grain size of less than 100 microns.

* * * * *